US012664629B2

(12) United States Patent
Catley-Chandar et al.

(10) Patent No.: US 12,664,629 B2
(45) Date of Patent: Jun. 23, 2026

(54) PERMUTATION INVARIANT HIGH DYNAMIC RANGE IMAGING

(71) Applicant: HUAWEI TECHNOLOGIES CO., LTD., Shenzhen (CN)

(72) Inventors: Sibi Catley-Chandar, London (GB); Eduardo Perez Pellitero, London (GB); Ales Leonardis, London (GB)

(73) Assignee: HUAWEI TECHNOLOGIES CO., LTD., Shenhen (CN)

( * ) Notice: Subject to any disclaimer, the term of this patent is extended or adjusted under 35 U.S.C. 154(b) by 558 days.

(21) Appl. No.: 18/310,711

(22) Filed: May 2, 2023

(65) Prior Publication Data

US 2023/0267582 A1      Aug. 24, 2023

Related U.S. Application Data

(63) Continuation of application No. PCT/EP2020/081146, filed on Nov. 5, 2020.

(51) Int. Cl.
*G06T 5/92*          (2024.01)
*G06T 5/20*          (2006.01)
(Continued)

(52) U.S. Cl.
CPC ................. *G06T 5/92* (2024.01); *G06T 5/20* (2013.01); *G06T 5/50* (2013.01); *G06T 5/70* (2024.01);
(Continued)

(58) Field of Classification Search
CPC .... G06T 5/92; G06T 5/20; G06T 5/50; G06T 5/70; G06T 2207/20084;
(Continued)

(56) References Cited

U.S. PATENT DOCUMENTS 8,525,900 B2      9/2013   Garten
9,648,251 B2      5/2017   Pouli et al.
(Continued)

FOREIGN PATENT DOCUMENTS

CN          110072051 A      7/2019
WO        2020171373 A1      8/2020

OTHER PUBLICATIONS

Liu et al., "Single-Image HDR Reconstruction by Learning to Reverse the Camera Pipeline", CVPR 2020, total 10 pages.
(Continued)

*Primary Examiner* — Phuoc Tran

(57)          ABSTRACT
An image processing apparatus for forming an enhanced image is disclosed. The apparatus comprises one or more processors configured to: receive one or more input images; form, from each of the one or more input images, a respective feature representation, each feature representation representing features of the respective input image; and subject the one or more feature representations to a symmetric pooling operation to form an enhanced image from at least some of the features of the one or more feature representations identified by the symmetric pooling operation. The apparatus may generate images with increased photoreceptive dynamic range, increased bit depth and signal-to-noise ratio, with less quantization error and richer colour representation.

15 Claims, 12 Drawing Sheets

Multiple encoders with shared weights + pooling across encoder

(51) Int. Cl.
　　*G06T 5/50*　　　　　　(2006.01)
　　*G06T 5/70*　　　　　　(2024.01)

(52) U.S. Cl.
　　CPC ............... *G06T 2207/20084* (2013.01); *G06T 2207/20208* (2013.01); *G06T 2207/20221* (2013.01)

(58) Field of Classification Search
　　CPC . G06T 2207/20208; G06T 2207/20221; G06T 5/60; G06T 5/90
　　See application file for complete search history.

(56) References Cited

U.S. PATENT DOCUMENTS

| | | | |
|---|---|---|---|
| 10,249,305 B2 | 4/2019 | Yu | |
| 11,842,460 B1 * | 12/2023 | Chen | .......................... G06T 5/60 |
| 2010/0245635 A1 | 9/2010 | Lin | |
| 2019/0096046 A1 | 3/2019 | Kalantari et al. | |
| 2020/0092453 A1 | 3/2020 | Gordon et al. | |
| 2020/0265567 A1 * | 8/2020 | Hu | ............................ G06N 3/09 |
| 2021/0392258 A1 * | 12/2021 | Gordon | ................... H04N 23/76 |
| 2021/0398257 A1 * | 12/2021 | Wang | .................... G06V 10/14 |
| 2023/0360182 A1 * | 11/2023 | Fanello | ................. G06V 10/60 |

OTHER PUBLICATIONS

Miika Aittala et al., "Burst Image Deblurring Using Permutation Invariant Convolutional Neural Networks", ECCV 2018, total 17 pages.
Kalantari et al., "Deep High Dynamic Range Imaging of Dynamic Scenes", SIGGRAPH 2017, total 12 pages.
M.Deudon et al., "HighRes-net: Recursive Fusion for Multi-Frame Super-Resolution of Satellite Imagery", arxiv:2002.06460v1, Feb. 15, 2020, total 15 pages.
Jae Woong Soh et al."Joint High Dynamic Range Imaging and Super-Resolution from a Single Image", IEEE Access, vol. 7. May 2, 2019, XP011762483, total 11 pages.

* cited by examiner

Figure 1(a)
Figure 1(b)
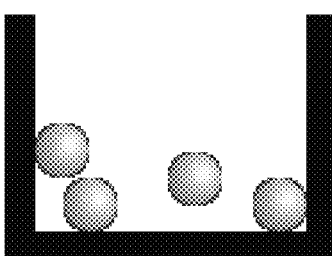 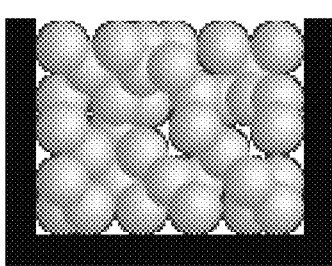
Figure 2(a)
Figure 2(b)
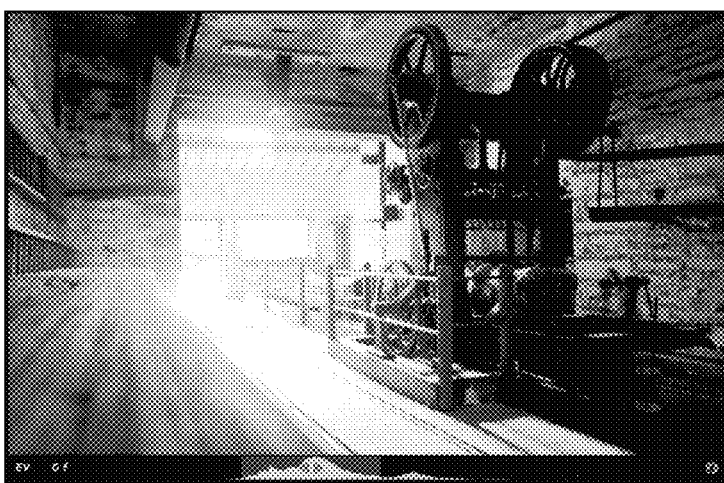

Multiple encoders with shared weights + max/av pooling

Single Image Backbone

Multiple encoders with shared weights + pooling across encoder

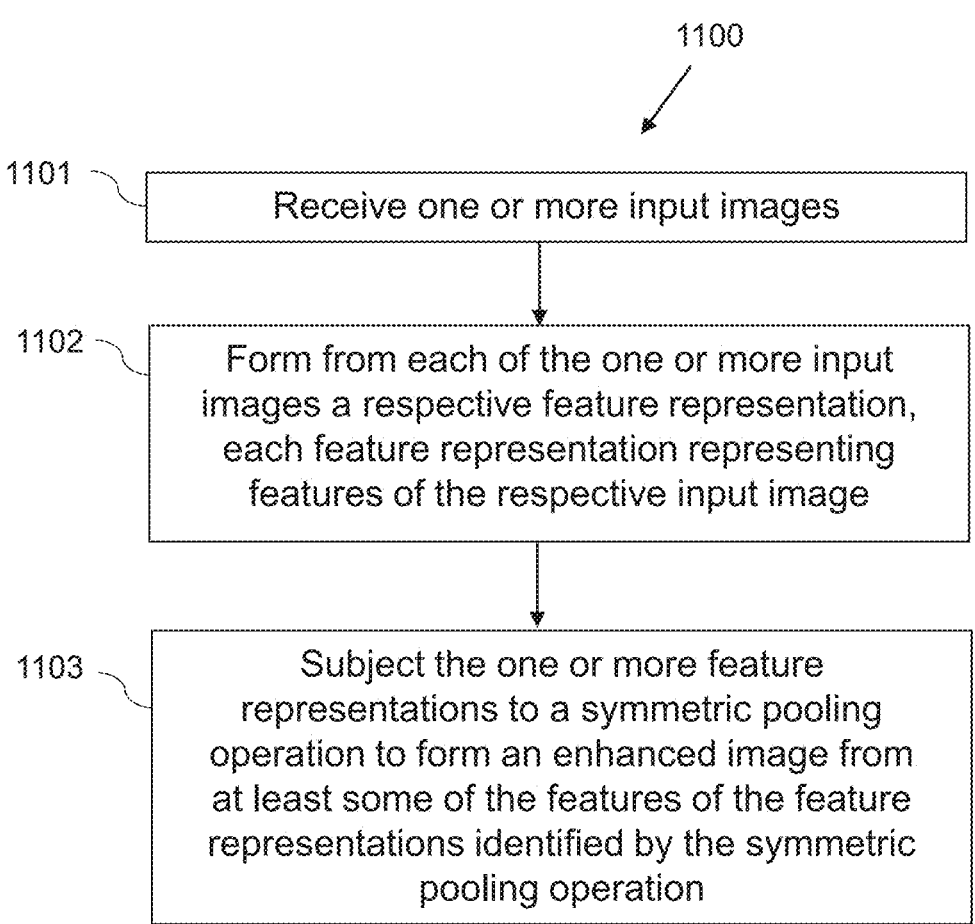

1100

1101  Receive one or more input images

1102  Form from each of the one or more input images a respective feature representation, each feature representation representing features of the respective input image 1103  Subject the one or more feature representations to a symmetric pooling operation to form an enhanced image from at least some of the features of the feature representations identified by the symmetric pooling operation

Cloud

Overexposed Input        Single Image Prediction

Two Inputs        Multi-image Prediction

PERMUTATION INVARIANT HIGH DYNAMIC RANGE IMAGING

CROSS-REFERENCE TO RELATED APPLICATIONS

This application is a continuation of International Application No. PCT/EP2020/081146, filed on Nov. 5, 2020. The disclosures of the aforementioned application are hereby incorporated by reference in entirety.

FIELD OF THE INVENTION

This present disclosure relates to the estimation of High Dynamic Range (HDR) images high from one or multiple Low Dynamic-Range (LDR) images.

BACKGROUND

Dynamic Range in images is defined as the ratio between the maximum and minimum measurable light intensities (white and black, respectively). The human visual system has a very broad dynamic range. Humans can perceive details in very bright and very dark scenes. However, cameras struggle to capture such richness of details due to the nature of their photoreceptors.

The sensor of a camera is composed of photosites, which act as light cavities which produce an electric signal when photons "fall" into them, as illustrated in FIGS. 1(a) and 1(b). Due to the inherent noise level in the signal, there is a minimum amount of photons each cavity can detect, and thus this will set the "minimum" light measurable by the camera. FIG. 1(a) illustrates an exemplary minimum measurable light due to the sensor noise level. At the other end of the luminosity, when there are too many electrons falling into the photosites, they can overflow and saturate, setting effectively the maximum measurable light, i.e., white colour. FIG. 1(b) illustrates an exemplary maximum measurable light due to an overflowing photosite. All of the luminosity present in the scene outside of this range, would be under- or over-exposed and thus parts of the scene luminosity would be lost.

If the luminosity of the scene is higher, several frames with different exposure values can help reveal all the details of the scene, as illustrated by FIGS. 2(a) and 2(b). In FIG. 2(a), bright details around windows and doors are revealed, but the back of the room is under-exposed. In FIG. 2(b), the region around the windows and doors is over-exposed, but details in the back of the room are well exposed.

The current dynamic range of cameras is far from being able to capture all the details present in high contrast scenes. For that reason, and given a static camera and scene, several frames are captured with different exposure values, i.e., Automatic Exposure Bracketing, and merged via a weighted fusion. This enables the obtained image to retain details present in all input images thus effectively increasing the dynamic range, which has been named a HDR image.

Prior approaches can generally be separated into two broad areas: multi-frame fusion, where multiple images exposed differently are combined through a linear weighted combination or a neural network, and single-image neural networks.

In multi-frame approaches, through bracketed exposure images, different ranges can be captured and fused together, leveraging a lot of information of the scene luminosity beyond the dynamic range of a single capture. However, multi-frame HDR poses several challenges. It requires accurate alignment and pixel registration between different frames, which is very difficult, particularly for scenes with high motion. Additionally, for certain types of photography, shooting several frames might not be possible, as the element of interest to be captured might only be available for a short span of time (for example, in wildlife photography, or sports).

In contrast, single-image HDR processing does not require any alignment between frames and thus is effective in reconstructing images with any amount of motion. However, the single-image HDR methods rely on hallucinating details that are under- or over-exposed in the low-dynamic-range input image. Thus, scenes that have a very broad luminosity range are not very well reconstructed, and such techniques are mostly suited to reconstructing HDR images whose luminosity range is only moderately higher than that of a single image.

It is desirable to develop a method that overcomes these problems.

SUMMARY

According to one aspect there is provided an image processing apparatus for forming an enhanced image, the apparatus comprising one or more processors configured to: receive one or more input images; form, from each of the one or more input images, a respective feature representation, each feature representation representing features of the respective input image; and subject the one or more feature representations to a symmetric pooling operation to form an enhanced image from at least some of the features of the one or more feature representations identified by the symmetric pooling operation.

The apparatus may process any arbitrary number of input frames, process frames in any order, and process frames with any exposure value. Content which is over-or under-exposed can be hallucinated when not available in any of the input frames. The apparatus and method can handle frames from different camera sensors/ISPs and handle different levels of noise per frame. The apparatus may result in images with increased photoreceptive dynamic range (i.e. capacity to capture shadows and highlights within the same scene), increased bit depth and signal-to-noise ratio, with less quantization error and richer colour representation.

The symmetric pooling operation may be such as to subject each feature representation to a common processing logic so as to identify the components of the respective feature representation. This may allow the components of each feature representation to be identified and used to form the enhanced image.

The symmetric pooling operation may be such as to operate independently of an order in which feature representations are provided to the symmetric pooling operation. The apparatus may therefore process input frames in any order and be permutation invariant.

The symmetric pooling operation may comprise a max pooling operation and/or an average pooling operation. These may be convenient implementations for performing the symmetric pooling operation.

The one or more processors may be configured to: subject each input image or data derived from it to a first convolution operation to form the respective feature representation(s); and form the enhanced image by subjecting an output of the symmetric pooling operation to a second convolution operation. A number of convolutions may therefore be applied to the input image to form the feature representation(s), followed by a symmetric pooling operation that creates a "single feature representation" of all the input images (or single image) and apply one or more convolutions to obtain the estimated HDR image.

The enhanced image may have a higher dynamic range than each of the one or more input images. This may allow a HDR image to be formed from one or more LDR input images.

The one or more processors may be configured to: subject an output of the symmetric pooling operation and the respective feature representation to a concatenation operation to form a respective intermediate feature representation. The second convolution operation may be performed on the intermediate feature representations. In the preferred implementation, this may be a single convolution after and a single convolution before the symmetric pooling operation. However, any number of convolutions before and after the symmetric pooling operation may be used.

The one or more processors may be configured to form each feature representation by performing one or more of refinement tasks including: denoising, dequantization, linearisation, camera response calibration and over and under-exposure correction on the respective input image. The refinement tasks may be intermediate refinement tasks. This may allow the deep learning model to comprise multiple neural networks that act sequentially to perform dynamic range enhancement of low dynamic range images, in both the single image and multi-image settings.

The symmetric pooling operation may be performed in conjunction with a trained neural network. For example, the convolutions around the symmetric pooling blocks may be learnable and may be implemented as a neural network.

The image processing apparatus may comprise a camera (or other imaging device). Each processor may be configured to receive the input images from the camera. The camera or other imaging device may be configured to capture the input images at different times and with different exposure settings. This may allow the apparatus to process a series of LDR images captured at different exposures.

The at least one input image may be subject to exposure normalization. This may result in improved image quality.

The apparatus may be configured to receive a single input image. Alternatively, the one or more processors may be configured to: receive multiple input images; form, from each of the multiple input images, a respective feature representation, each feature representation representing features of the respective input image; and subject the feature representations to a symmetric pooling operation to form an enhanced image by fusing at least some of the features of the one or more feature representations identified by the symmetric pooling operation. Thus, the apparatus may process one or multiple LDR images to form the enhanced image.

The enhanced image may be an estimated high-dynamic-range image and the one or more input images may be of lower dynamic range than the high-dynamic-range image. This may allow a HDR image to be produced from one or more LDR images.

According to a second aspect, there is provided an exemplary computer-implemented method for forming an enhanced image, the method comprising: receiving one or more input images; forming from each of the one or more input images a respective feature representation, each feature representation representing features of the respective input image; and subjecting the one or more feature representations to a symmetric pooling operation to form an enhanced image from at least some of the features of the feature representations identified by the symmetric pooling operation.

This method may process any arbitrary number of input frames, process frames in any order, and process frames with any exposure value. Content which is over-or under-exposed can be hallucinated when not available in any of the input frames. The method can handle frames from different camera sensors/ISPs and handle different levels of noise per frame.

The receiving of the one or more input images may comprise receiving multiple input images and the fields of view of each input image are the same. The input images may therefore be of an identical field of view (for example, derived from a common photo)

The receiving of the one or more input images may comprise receiving multiple input images and the fields of view of at least two of the input images are different. For example, the input images may be sequentially captured photos.

BRIEF DESCRIPTION OF THE FIGURES

The present invention will now be described by way of example with reference to the accompanying drawings.

In the drawings:

FIGS. 1(a) and 1(b) schematically illustrate example dynamic range limitations due to sensor photosites. FIG. 1(a) illustrates minimum measurable light due to the sensor noise level and FIG. 1(b) illustrates maximum measurable light due to an overflowing photosite.

FIGS. 2(a) and 2(b) show an example of different exposure values photographs of the same scene.

FIG. 8 shows a schematic illustration of an example of the network architecture for linearization.

FIG. 9 shows a schematic illustration of an example of the network architecture for exposure correction.

FIG. 11 shows an example of a computer-implemented method for forming an enhanced image.

FIG. 12 shows an example of a device configured to implement the method described herein.

DETAILED DESCRIPTION

Figure 3:
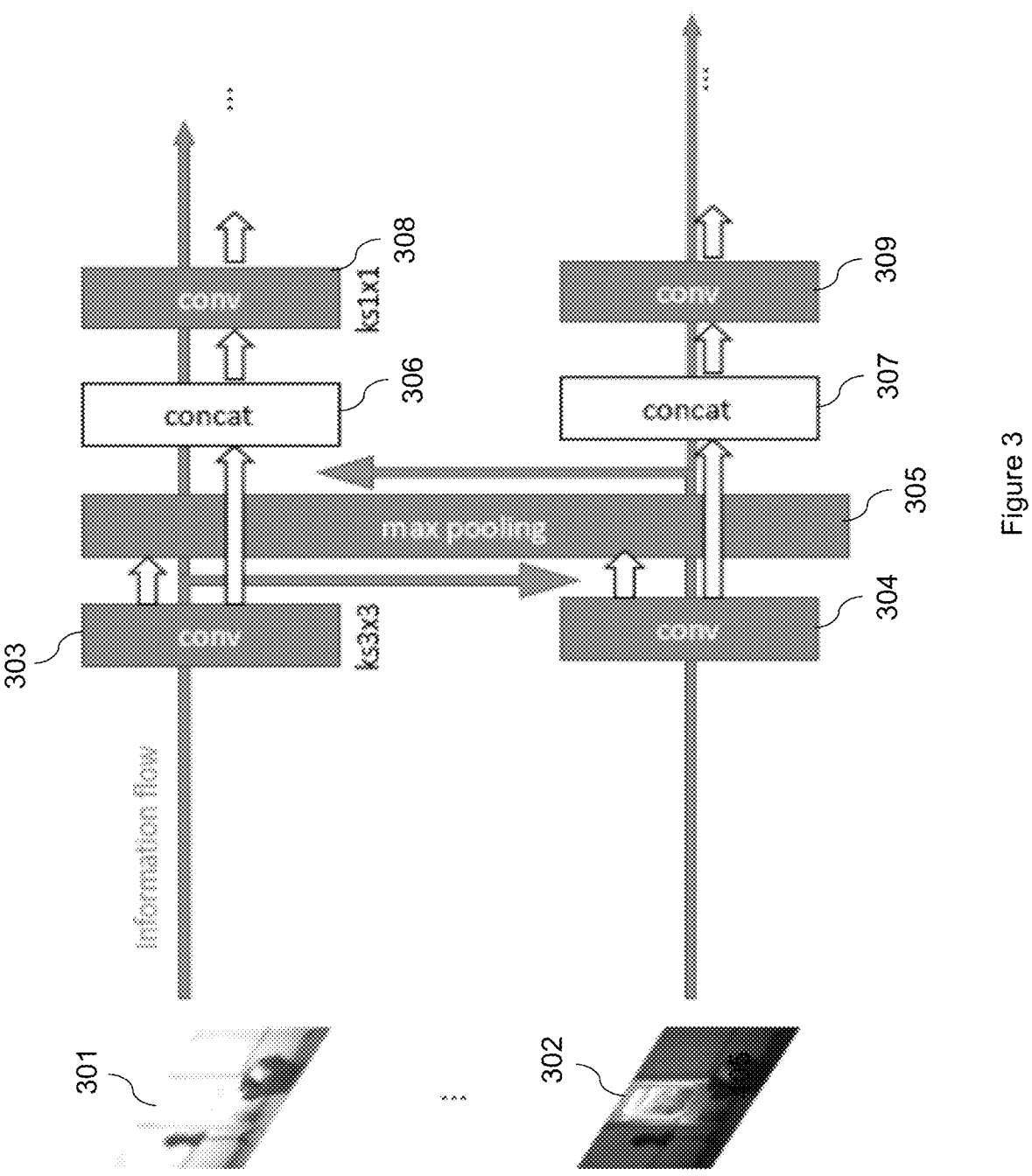
FIG. 3 shows a schematic illustration of the local symmetric pooling block.

Embodiments of the present disclosure relate to high-dynamic-range image estimation from one or multiple low-dynamic-range images.

The present disclosure solves a problem of obtaining a HDR image from either a single LDR image or a set of them (i.e., multiframe) by means of a permutation invariant modular deep learning model that can, in some embodiments. jointly denoise, dequantize and reconstruct under- and over-exposed regions.

In summary, the image processing apparatus forms an enhanced image, which is an estimated HDR image. The apparatus is configured to receive one or more input images. From each of the one or more input images, the apparatus is configured to form a respective feature representation, each feature representation representing features of the respective input image. The apparatus is configured to subject the one or more feature representations to a symmetric pooling operation to form the enhanced image from at least some of the features of the one or more feature representations identified by the symmetric pooling operation.

The symmetric pooling operation is such as to subject the feature representation(s) to a common processing logic so as to identify the components of the respective feature representation. A feature representation is formed by applying a transformation to the input image. The feature representation outlines characteristics of the input image that are useful for the final task. In the present case, the feature representations identify characteristics that help the HDR task and are compatible with the symmetric pooling operation.

The apparatus and method described herein can handle any number of input frames (single or multiple, with any configuration of exposure values and input in any order), and can handle both fusion of image details as well as hallucination of lacking details if some regions of the input image or images are not available.

The apparatus achieves this flexibility by a permutation invariant-aware design that takes advantage of using symmetric operations (such as max pooling) across different copies of the neural network. Therefore, the symmetric pooling operation is such as to operate independently of an order in which feature representations are provided to the symmetric pooling operation.

The algorithm used by apparatus can adapt any deep single image HDR model to a deep permutation invariant single and multi-image HDR model through inclusion of specific intermediate and global symmetric pooling operations across multiple identical copies of the model. This may allow for the use of an arbitrary number of inputs in any permutation with any exposure value.

The deep learning model can, in some embodiments which will be described herein, jointly perform denoising or joint denoising and demosaicing (JDD), dequantization, camera response calibration, over- and under-saturation correction as sequential building blocks for dynamic range enhancement. The method allows for use of images from different camera sensors/ISPs and can handle different levels of noise per frame (i.e., each input image may have a different level of noise).

Embodiments of the present disclosure can provide an example training strategy where subtasks are trained separately in a way such that no fully annotated data is needed. This may make it easier to collate training data.

The network takes as input any number of low dynamic range images, from multiple different sensors and ISPs if necessary, in any permutation. Where the network receives multiple input images, the input images can have different noise levels and different exposure values. In summary, the input is an arbitrary number of LDR images and the output is an estimated HDR image.

The symmetric pooling operations is a means to provide a scalable fusion mechanism that will work with any number of images. The symmetric pooling resorts to a single image model when only feeding one image as input and provides an effective mechanism for sharing information via pooling when multiple frames are available.

The symmetric pooling operations are defined in such a way that if applied to a single input they do not modify it: the output will be the same as the input (i.e., identity transformation). A max pooling of a single image feature representation will be that same image feature representation.

In the multi-image case, the apparatus is configured to receive multiple input images, form, from each of the multiple input images, a respective feature representation, and subject the feature representations to a symmetric pooling operation to form an enhanced image by fusing at least some of the features of the one or more feature representations identified by the symmetric pooling operation. The fused features may correspond to the same features of a respective image. Therefore, one or more features of each of the feature representations may at least partly (in some cases entirely) refer to the same image characteristic.

For the single image case, the input is Im_1. The feature extractor is applied to the image, i.e., F(Im_1). The set of features are passed through the max pooling operation max(F(Im_1)). The max pooling of a single image is just the identity, so max(Im_1)=Im_1 and thus the model will work without having to change the architecture.

This global max pooling can happen in any of the intermediate tasks as described later in the examples (for example, denoising, dequantization, over- and under-exposure correction). Preferably, the global max pooling is applied towards the end of the pipeline, for example in the over- and under-exposure correction stages.

For permutation invariance, the global symmetric pooling preferably happens at least once, and after the global symmetric pooling is performed, all of the heads are then collapsed into a single one. In contrast, local symmetric pooling can happen as often as desired and does not collapse the heads into one single head.

The mechanism of the local symmetric pooling operation is illustrated in FIG. 3 for two input images 301 and 302.

Each input image 301, 302 is subjected to a first convolution operation 303, 304 to form the respective feature representations. The symmetric pooling operation, which in this example is a max pooling operation, is shown at 305. The outputs are concatenated at 306, 307 and the enhanced image is formed by subjecting the output to a second convolution operation 308, 309. The concatenation operation 306, 307 forms a respective intermediate feature representation and the second convolution operation 308, 309 is performed on the intermediate feature representations.

Figure 4B:
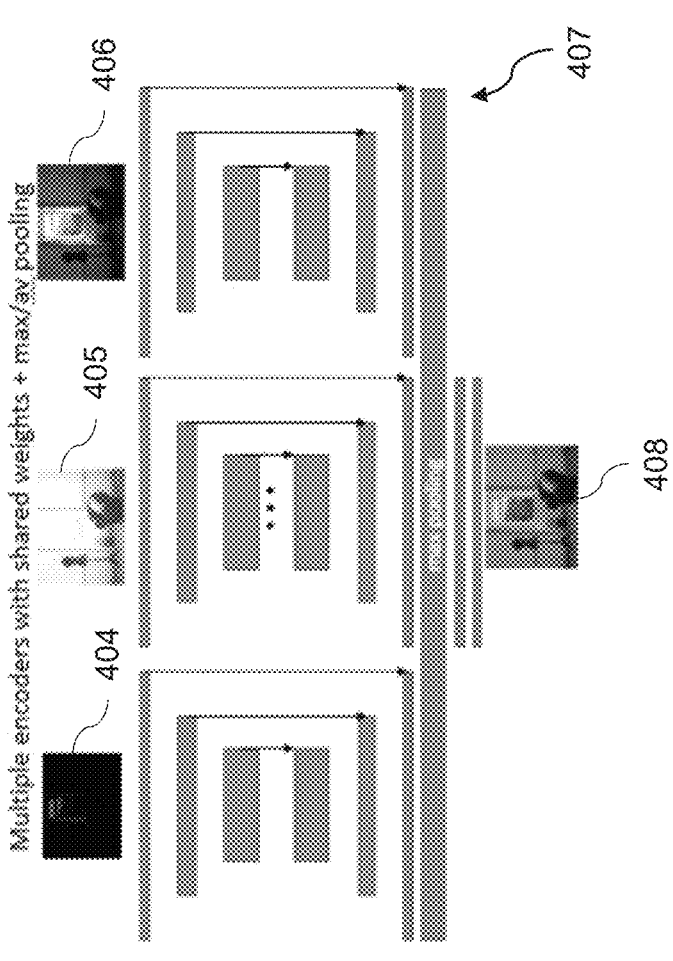
FIG. 4(a) and FIG. 4(b) show examples of the approach with a global symmetric pooling operation.
Figure 4A:
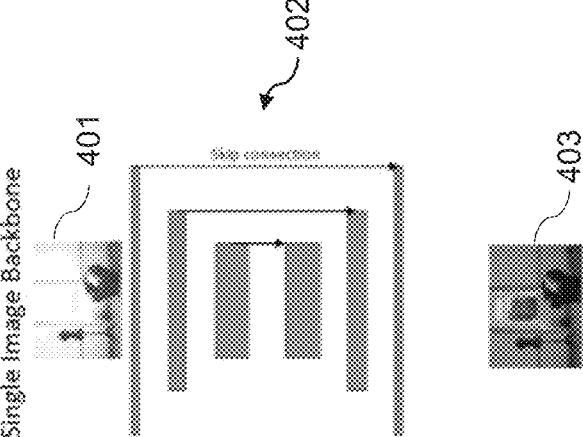

FIGS. 4(*a*) and 4(*b*) show the approach with only a global symmetric pooling operation. FIG. 4(*a*) shows the single image backbone with input image 401 input to network 402 with skip connections, resulting in output 403. In FIG. 4(*b*), multiple input images 404, 405, 406 are each input to such a network. The multiple encoders have shared weights, one for each input image. The symmetric pooling layers (in this example, max pooling) are applied across the multiple copies of the network on the resulting feature representations, as shown at 407. The enhanced output image is shown at 408.

Figure 5:
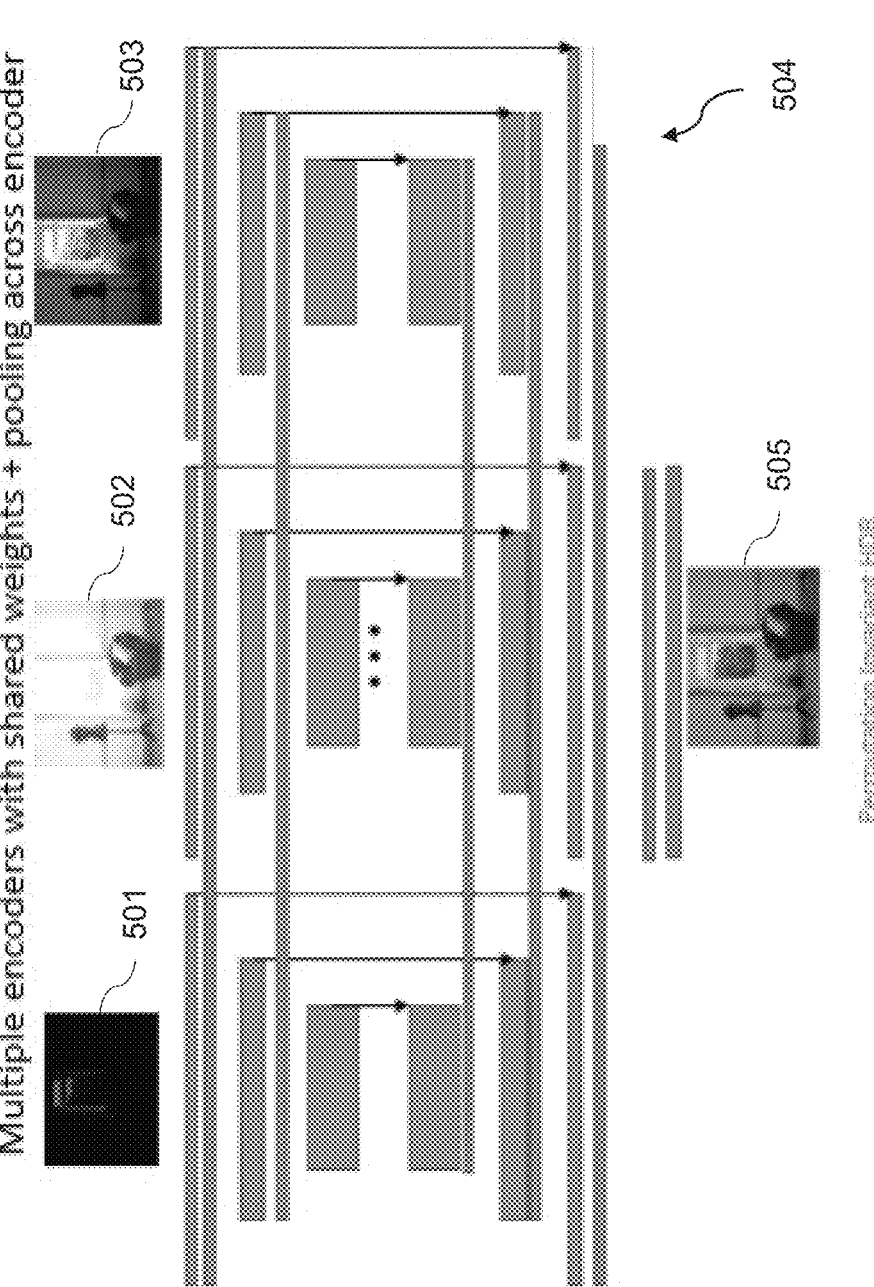
FIG. 5 shows an example of the approach using local and global symmetric pooling blocks.

FIG. 5 shows the approach using local and global symmetric pooling across the encoders 504. Each input image 501, 502, 503 is subjected to a first convolution operation to form the respective feature representations. The outputs of the local symmetric pooling operation are concatenated and the HDR image is formed by subjecting the output to a second convolution operation. The concatenation operation forms a respective intermediate feature representation and the second convolution operation is performed on the intermediate feature representations. Local symmetric pooling enables more channels of information sharing across different copies of the network or heads, while each head retains distinctive features due to the concatenation operation. The HDR output image is shown at 505.

Figure 6:
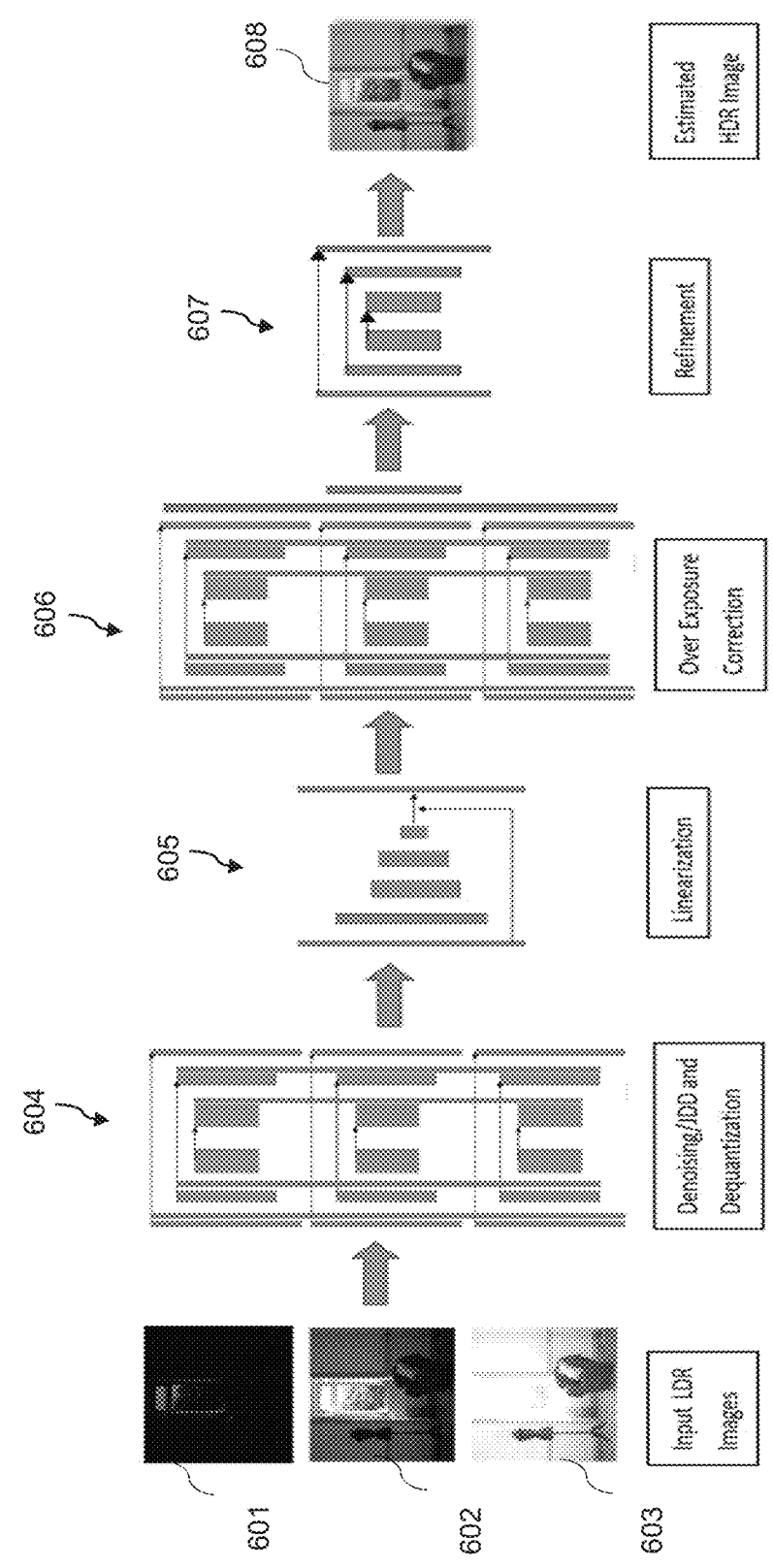
FIG. 6 shows a schematic illustration of the example single and multi-image HDR deep learning model incorporating different image processing operations.

FIG. 6 illustrates an exemplary summary of the stages of the single and multi-image HDR deep learning model. In FIG. 6, the input images are shown at 601, 602 and 603. In this example, the deep learning model comprises four neural networks that act sequentially to perform dynamic range enhancement of low dynamic range images, in both the single image and multi-image settings. In FIG. 6, the stages of the architecture are denoising/JDD and dequantization 604, linearization 605, over exposure correction 606 and refinement 607. The resulting estimated HDR image is shown at 608.

Figure 7:
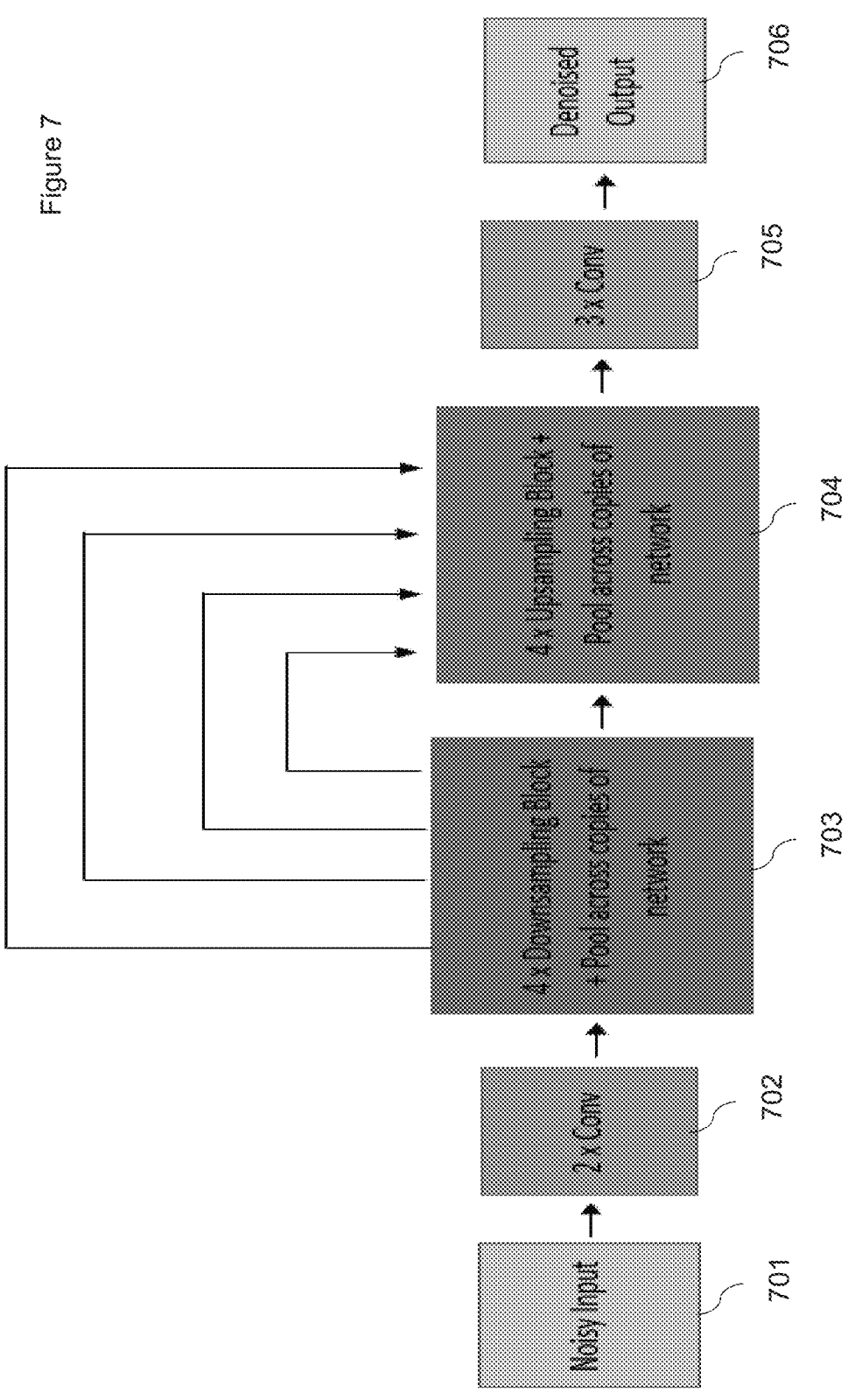
FIG. 7 shows a schematic illustration of an example of the network design for denoising/JDD and dequantization.

The denoising architecture is illustrated in FIG. 7. This network jointly performs denoising/JDD and dequantization. It has a U-Net structure, with skip connections between the encoder and decoder, indicated by the arrows. The noisy input image is shown at 701. The feature representations formed from the input images are put through convolutional layers 702. Symmetric pooling layers are applied across multiple copies of the network with shared weights, one for each input image. The downsampling and upsampling are shown at 703 and 704 respectively. The upsampled feature maps are then put through convolutional layers 705 to give the denoised output at 706.

Figure 8:
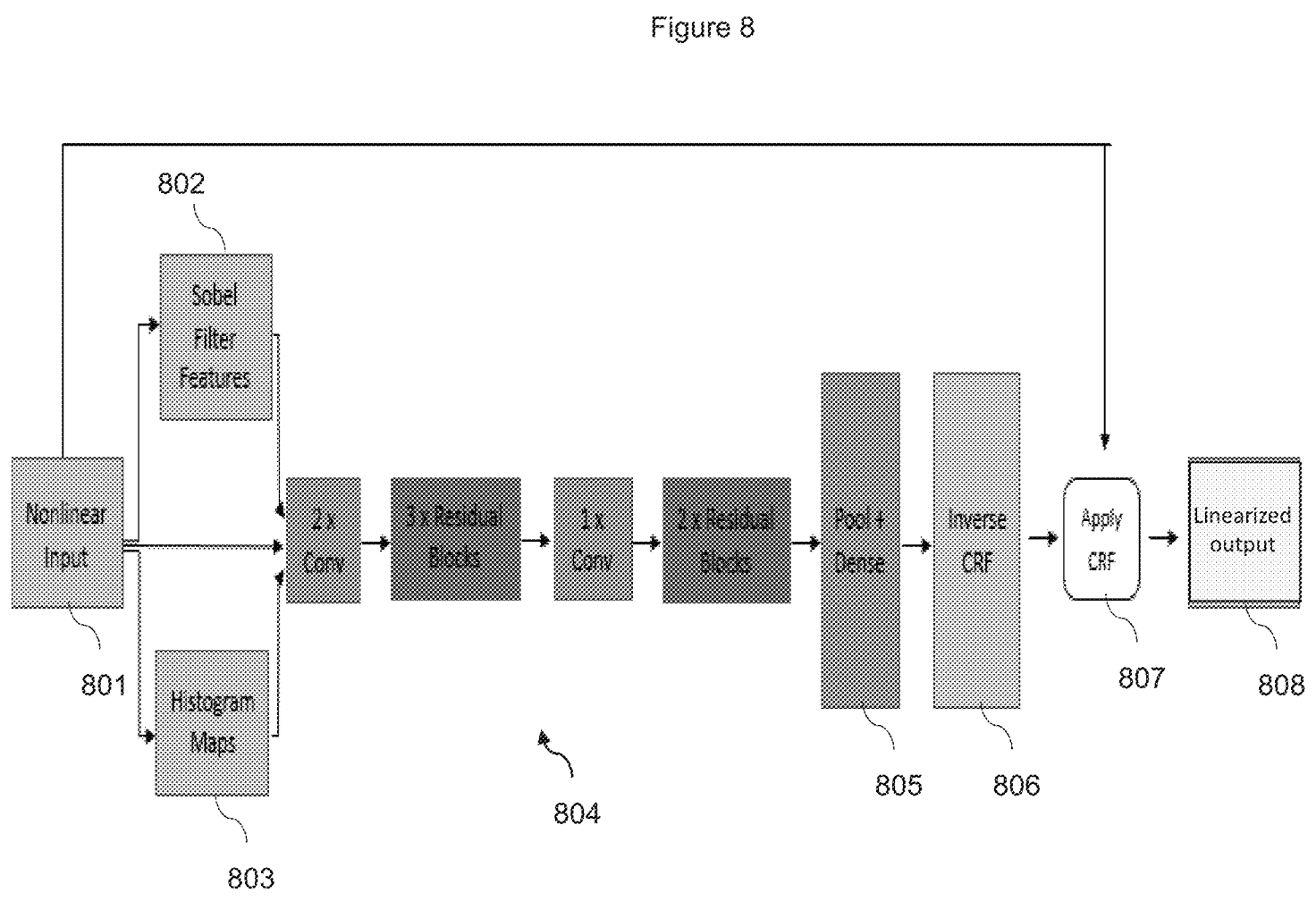

The network architecture shown in FIG. 8 performs linearization by predicting the weights needed to generate an inverse camera response function, which is applied to the nonlinear input image 801. The network has a ResNet structure comprising residual blocks. The input image 801, along with sobel filter features 802 and histogram maps 803, is put through convolutional layers and residual blocks, as shown at 804. Pooling is performed at 805, an inverse Camera Response Function (CRF) step at 806, and CRF at 807 to give the linearized output at 808.

Figure 9:
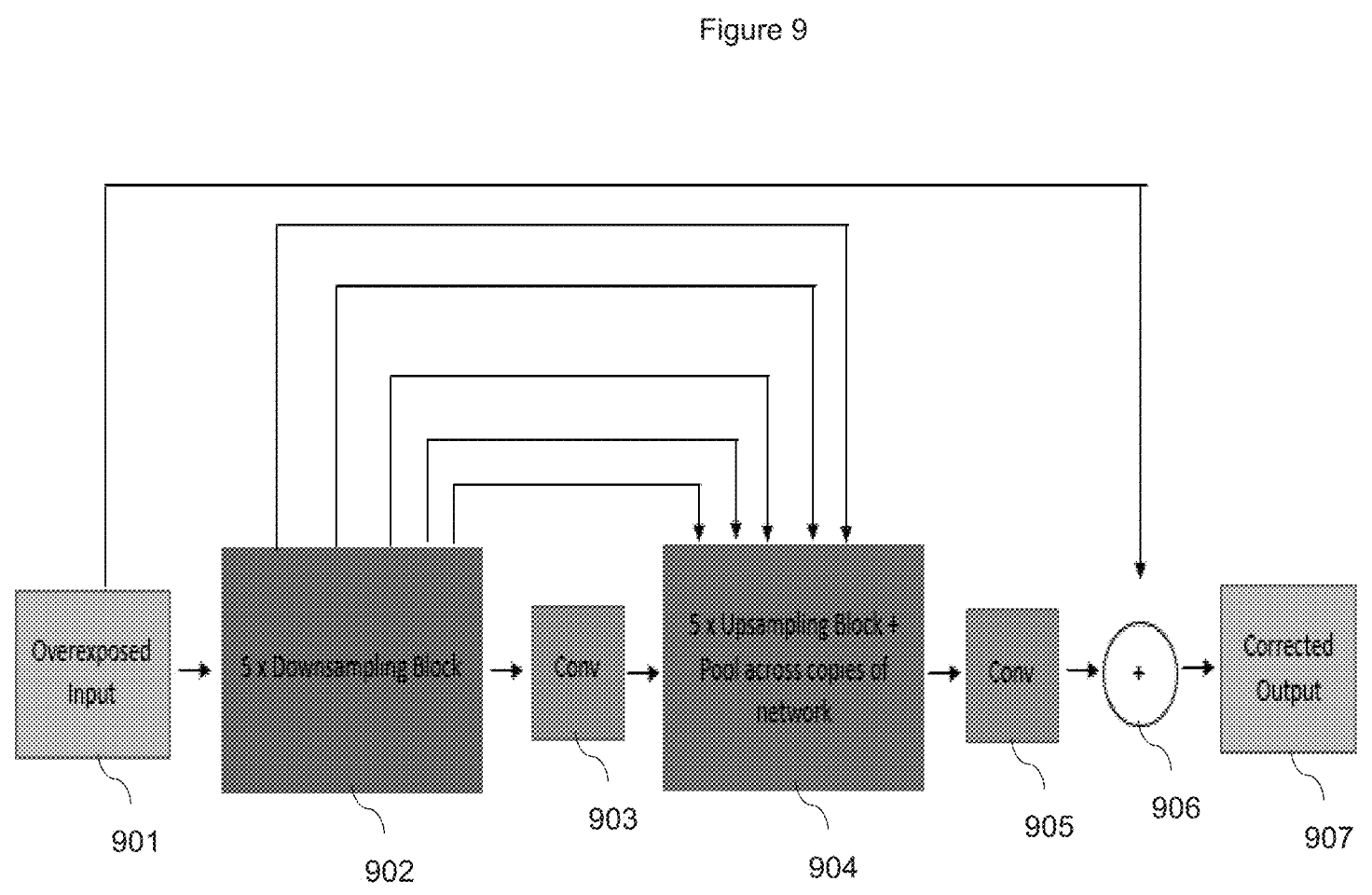

The network architecture shown in FIG. 9 performs exposure correction by hallucination of details in the over-exposed regions of the image, and also fusion of details from multiple sources when there are multiple input images. It has a U-net structure with skip connections between the encoder and decoder, as shown by the arrows. The over-exposed input is shown at 901. The input is downsampled as shown at 902, before going through a convolutional layer at 903. At 904, upsampling is performed with symmetric pooling layers applied across multiple copies of the network with shared weights, one for each input image. After going through a convolutional layer at 905 and concatenation at 906, the corrected output is shown at 907.

Figure 10:
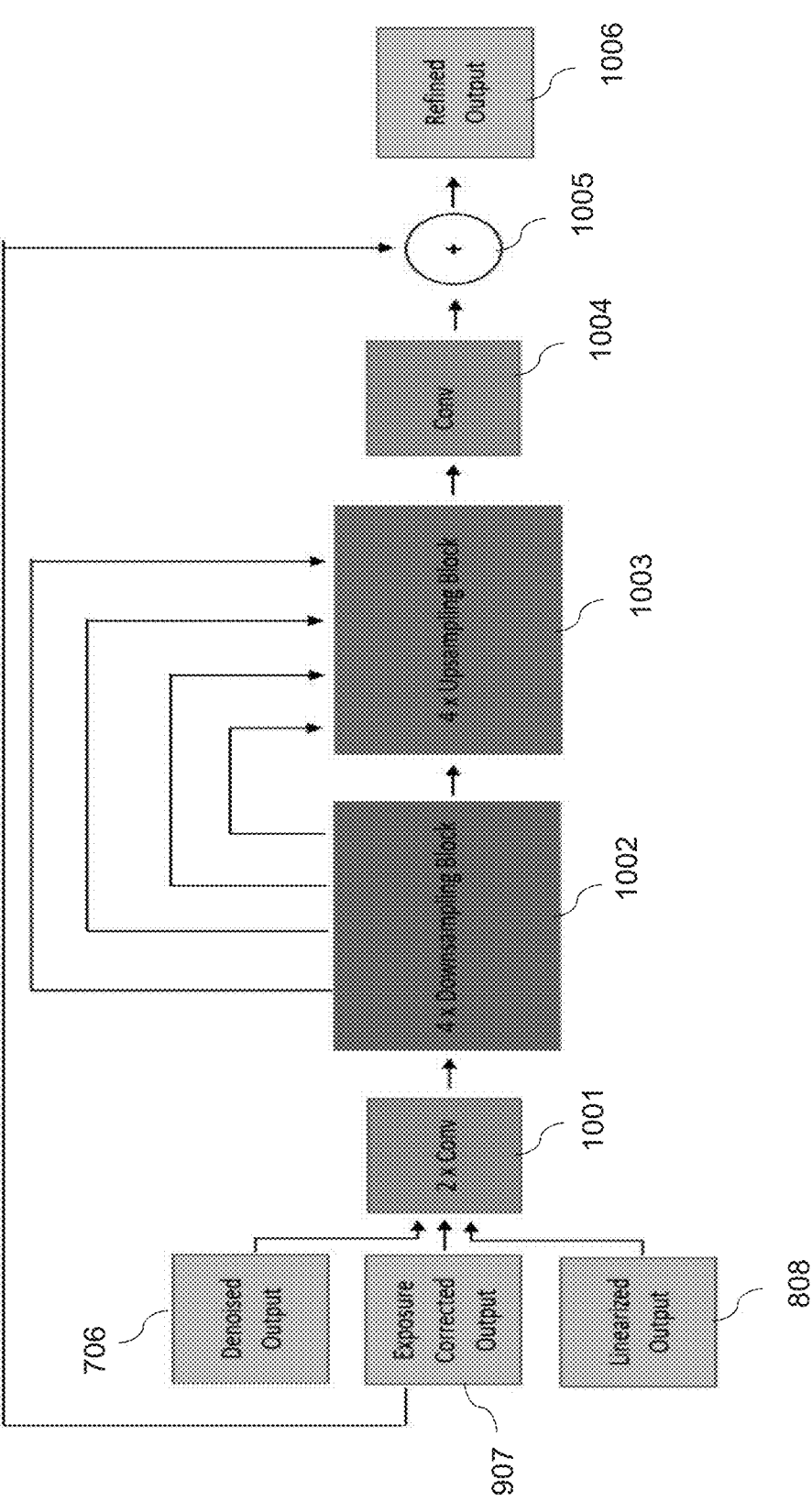
FIG. 10 shows a schematic illustration of an example of the network architecture for refinement.

The network architecture shown in FIG. 10 performs refinement of the image to improve visual quality. It has a U-Net structure, with skip connections between the encoder and decoder. This network takes the denoised output 706, the exposure corrected output 907 and the linearized output 808 and puts them through convolutional layers 1001 before downsampling 1002, upsampling 1003 and a further convolutional layer 1004 before concatenating at 1005 to give the refined output 1006.

In the preferred implementation, as shown in FIG. 6, the deep learning model comprises the four networks described above with reference to FIGS. 7-10 in sequence. For simplification, in FIGS. 7-10, a single copy of each model is shown, although multiple copies of the same model, with shared weights, are preferably used for denoising and exposure correction, as shown in FIG. 6.

To train the network, each subtask is first trained separately. To train the denoising/JDD network, the mean of the squared difference between pixels in the predicted image $D_{Pred}$ and ground truth image $D_{GT}$ is minimized. If N is the number of pixels in the image, the loss function is:

$$L_{Denoise} = \frac{1}{N} \times \|D_{Pred} - D_{GT}\|_2^2$$

To train the linearization network, the mean of the squared difference between pixels in the predicted image $L_{Pred}$ and ground truth image $L_{GT}$ is minimized. The squared difference between the predicted inverse CRF $C_{Pred}$ and ground truth inverse CRF $C_{GT}$ is also minimized. If N is the number of pixels in the image and M is the number of elements in the predicted inverse CRF, then the loss is given by:

$$L_{Linearize} = \frac{1}{N} \times \|L_{Pred} - L_{GT}\|_2^2 + 0.1 \times \frac{1}{M} \times \|C_{Pred} - C_{GT}\|_2^2$$

To train the exposure correction network, the predicted image $H_{Pred}$ is tonemapped using the μ-Law tonemapping function with γ=10 to obtain $H_{Pred\_tonemapped}$. The ground truth image $H_{GT}$ is also tonemapped in the same way to obtain $H_{GT\_tonemapped}$. A mask of the overexposed regions of the input image $H_{mask\_overexposed}$ and also a mask of non-overexposed regions $1-H_{mask_{overexposed}}$ are computed. These masks are applied to the tonemapped prediction and ground truth images to get $H_{Pred\_overexposed}$, $H_{Pred\_normal}$, $H_{GT\_overexposed}$, $H_{GT\_normal}$.

The loss function is then given by the pixel-wise reconstruction loss (L1 loss) on the masked images as follows:

$$L_{Exposure} = 0.5 \times \frac{1}{N} \times |H_{Pred_{overexposed}} - H_{GT_{overexposed}}| +$$
$$0.5 \times \frac{1}{N} \times |H_{Pred_{normal}} - H_{GT_{normal}}|$$

After training the three subtasks separately, the three networks can be jointly trained together to improve performance:

$$L_{Finetune} = L_{Exposure} + L_{Linearize} + L_{Denoise}$$

To train the refinement network, this network is jointly finetuned with the other three subnetworks. The pixelwise reconstruction loss (L1 loss) between the tonemapped predicted image $R_{Pred\_tonemapped}$ and the tonemapped ground truth $R_{GT\_tonemapped}$ is minimized:

$$L_{Refine} = \frac{1}{N} \times |R_{Pred\_tonemapped} - R_{GT\_tonemapped}|$$

For a multi-image HDR dataset, the single image HDR reconstruction dataset can be adapted to train the model. A series of transformations are applied to the ground truth HDR images to generate LDR-HDR pairs for training.

In one example, the longer side of the HDR image is resized to size 1024 and the shorter side to size 512. This image is then split into two 512×512 ground truth HDR images. This set of images is the ground truth for the exposure correction and refinement networks. A burst size, b, between 1 and n is then randomly chosen. b exposures in the range [−8,8] are randomly sampled and these exposures are applied to the ground truth image to get b exposed images. The dynamic range of these images is clipped to be between 0 and 1. This is the ground truth of the linearization network. CRFs are randomly sampled from the Database of Response Function (DoRF) and applied to the clipped images. This is the ground truth of the denoising network. Noise is added with two components, a fixed element and a signal-dependent element. Using the noise model, the variance of the ground truth is approximated by using the noisy image instead and this estimated variance is concatenated to each image. All images within a burst are aligned by exposure value.

Therefore, embodiments of the present disclosure may provide an example apparatus configured to implement an algorithm to adapt any single image HDR model to become a permutation invariant single and multi-image HDR model through the inclusion of specific intermediate and global symmetric pooling operations (for example average or max pooling) as described. The deep learning model described herein may jointly perform denoising/JDD, dequantization, camera response calibration, over- and under-saturation correction as sequential building blocks for both single and multiframe dynamic range enhancement. Embodiments of the present disclosure may provide a training strategy whereby subtasks are trained separately in such a way that no fully annotated data is required.

FIG. 11 shows an example of a computer-implemented image processing method. At step 1101, the method comprises receiving one or more input images. At step 1102, the method comprises forming from each of the one or more input images a respective feature representation, each feature representation representing features of the respective input image. At step 1103, the method comprises subjecting the one or more feature representations to a symmetric pooling operation to form an enhanced image from at least some of the features of the feature representations identified by the symmetric pooling operation.

The apparatus may comprise an imaging device, such as a camera. Where multiple images are used as input, the apparatus may be configured to, in response to an input from a user of the apparatus, cause the camera, or other imaging device, to capture each of the input images with a different exposure from the other input images. The captured images may also have different noise levels.

Figure 12:
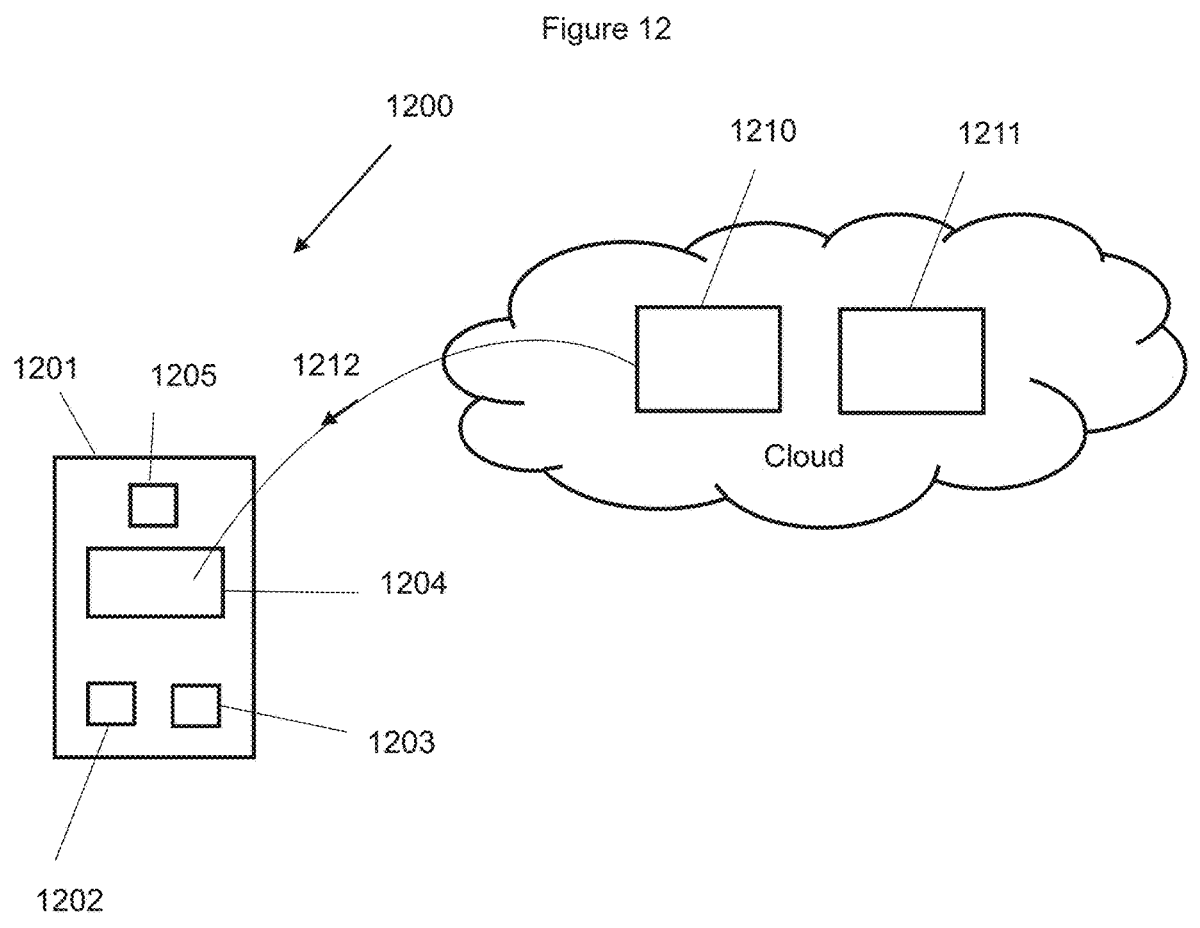

FIG. 12 shows an example image processing apparatus 1200 comprising an imaging device 1201, for example a camera, configured to use the method describe herein to process image data captured by at least one image sensor in the device. The device 1201 comprises image sensors 1202, 1203. Such a device 1201 typically includes some onboard processing capability. This could be provided by the processor 1204. The processor 1204 could also be used for the essential functions of the device.

The transceiver 1205 is capable of communicating over a network with other entities 1210, 1211. Those entities may be physically remote from the device 1201. The network may be a publicly accessible network such as the internet. The entities 1210, 1211 may be based in the cloud. Entity 1210 is a computing entity. Entity 1211 is a command and control entity. These entities are logical entities. In practice, they may each be provided by one or more physical devices such as servers and data stores, and the functions of two or more of the entities may be provided by a single physical device. Each physical device implementing an entity comprises a processor and a memory. The devices may also comprise a transceiver for transmitting and receiving data to and from the transceiver 1205 of device 1201. The memory stores in a non-transient way code that is executable by the processor to implement the respective entity in the manner described herein.

The command and control entity 1211 may train the model(s) used in the device. This is typically a computationally intensive task, even though the resulting model(s) may be efficiently described, so it may be efficient for the development of the algorithm to be performed in the cloud, where it can be anticipated that significant energy and computing resource is available. It can be anticipated that this is more efficient than forming such a model at a typical imaging device.

In one implementation, once the algorithms have been developed in the cloud, the command and control entity can automatically form a corresponding model and cause it to be transmitted to the relevant imaging device. In this example, the model is implemented at the device 1201 by processor 1204.

In another possible implementation, an image may be captured by one or both of the sensors 1202, 1203 and the image data may be sent by the transceiver 1205 to the cloud for processing. The resulting image could then be sent back to the device 1201, as shown at 1212 in FIG. 12.

Therefore, the method may be deployed in multiple ways, for example in the cloud, on the device, or alternatively in dedicated hardware. As indicated above, the cloud facility could perform training to develop new algorithms or refine existing ones. Depending on the compute capability near to the data corpus, the training could either be undertaken close to the source data, or could be undertaken in the cloud, e.g., using an inference engine. The method may also be implemented on the device, in a dedicated piece of hardware, or in the cloud.

Figure 13A:
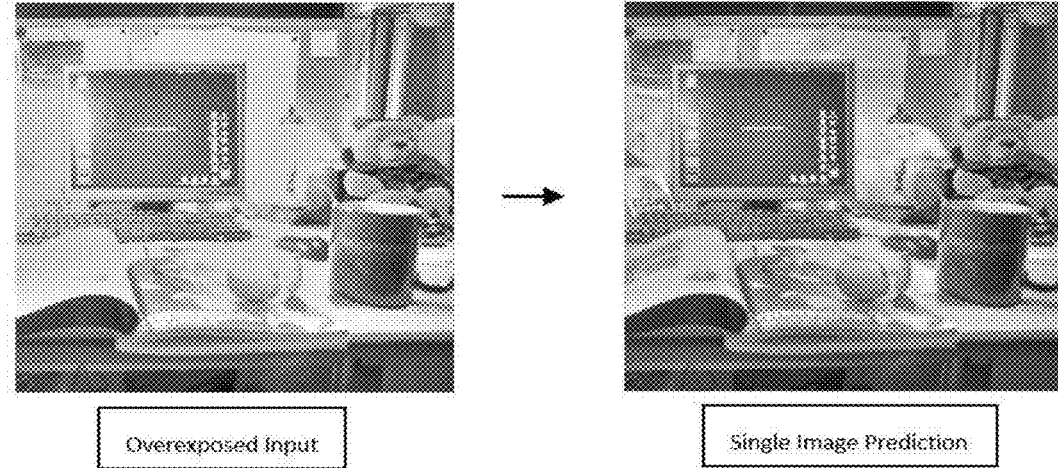
FIGS. 13(a) and 13(b) show examples of results obtained using the method described herein.
Figure 13B:
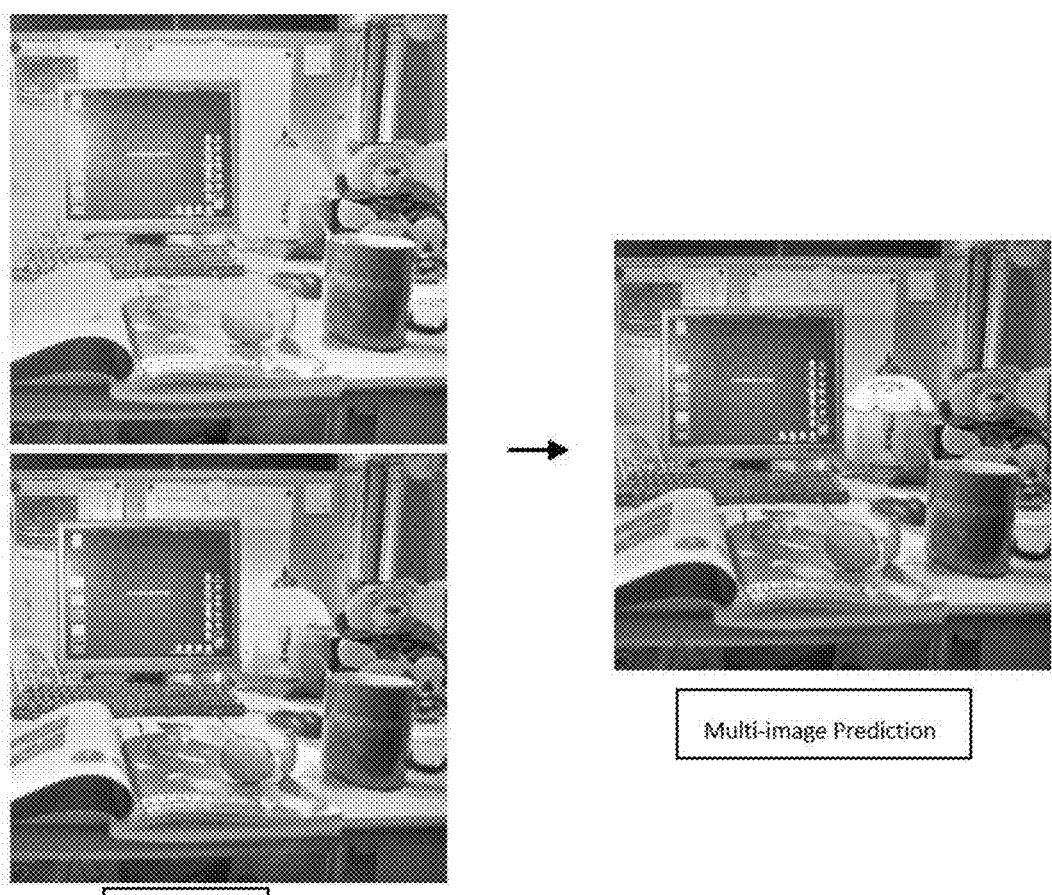

FIGS. 13(a) and 13(b) show examples of results produced using the method described herein (using the Single Image HDR test set). FIG. 13(a) shows the result using a single image and an example of the result for multiple images (two images in this example) is shown in FIG. 13(b). An improvement in image quality compared to the input(s) is observed in both cases.

The apparatus and method described herein may process any arbitrary number of input frames, process frames in any order, and process frames with any exposure value. Content which is over-or under-exposed can be hallucinated when not available in any of the input frames. The apparatus and method can handle frames from different camera sensors/ISPs and handle different levels of noise per frame. The deep learning model may train without data that is fully annotated (only pairs of tasks are needed).

This deep learning pipeline retains the benefits of both single- and multi-frame HDR models.

The apparatus and method described herein may result in images with increased photoreceptive dynamic range (i.e., capacity to capture shadows and highlights within the same scene), increased bit depth and signal-to-noise ratio, with less quantization error and richer colour representation, for example, 16 bits per channel RGB images.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present disclosure may consist of any such individual feature or combination of features. In view of the foregoing description, it will be evident to a person skilled in the art that various modifications may be made within the scope of the disclosure.

The invention claimed is:

1. An image processing apparatus for forming an enhanced image, comprising one or more processors configured to:

receive one or more input images;

form, from each of the one or more input images, a respective feature representation, each feature representation representing features of the respective input image; and subject the one or more feature representations to a symmetric pooling operation to form an enhanced image from at least some of the features of the one or more feature representations identified by the symmetric pooling operation, wherein the symmetric pooling operation is performed in conjunction with a trained neural network, wherein the enhanced image is an estimated high-dynamic-range image and the one or more input images are of lower dynamic range than the estimated high-dynamic-range image, and wherein the symmetric pooling operation operates independently of an order in which the feature representations are provided to the symmetric pooling operation.

2. An image processing apparatus as claimed in claim 1, wherein the symmetric pooling operation is performed to subject each feature representation to a common processing logic so as to identify components of the respective feature representation.

3. An image processing apparatus as claimed in claim 1, wherein the symmetric pooling operation comprises a max pooling operation and/or an average pooling operation.

4. An image processing apparatus as claimed in claim 1, wherein the one or more processors are configured to:

subject each input image or data derived from the input image to a first convolution operation to form the respective feature representation(s); and form the enhanced image by subjecting an output of the symmetric pooling operation to a second convolution operation.

5. An image processing apparatus as claimed in claim 4, wherein the one or more processors are configured to:

subject an output of the symmetric pooling operation and the respective feature representation to a concatenation operation to form a respective intermediate feature representation; and wherein the second convolution operation is performed on the intermediate feature representations.

6. An image processing apparatus as claimed in claim 1, wherein the one or more processors are configured to form each feature representation by performing one or more of refinement tasks including: denoising, dequantization, linearisation, camera response calibration and over and under-exposure correction on the respective input image.

7. An image processing apparatus as claimed in claim 1, comprising a camera and wherein the one or more processors are configured to receive the input images from the camera.

8. An image processing apparatus as claimed in claim 7, wherein the camera is configured to capture the input images at different times and with different exposure settings.

9. An image processing apparatus as claimed in claim 1, wherein the one or more input images are subject to exposure normalization.

10. An image processing apparatus as claimed in claim 1, wherein the apparatus is configured to receive a single input image.

11. An image processing apparatus as claimed in claim 1, wherein the enhanced image is formed by fusing at least some of the features of the one or more feature representations.

12. A computer-implemented method for forming an enhanced image, comprising:

receiving one or more input images;

forming, from each of the one or more input images, a respective feature representation, each feature representation representing features of the respective input image; and subjecting the one or more feature representations to a symmetric pooling operation to form an enhanced image from at least some of the features of the feature representations identified by the symmetric pooling operation, wherein the symmetric pooling operation is performed in conjunction with a trained neural network, wherein the enhanced image is an estimated high-dynamic-range image and the one or more input images are of lower dynamic range than the estimated high dynamic range image, and wherein the symmetric pooling operation operates independently of an order in which the feature representations are provided to the symmetric pooling operation.

13. A method as claimed in claim 12, wherein the receiving of one or more input images comprises receiving multiple input images and fields of view of the multiple input images are the same.

14. A method as claimed in claim 12, wherein the receiving of one or more input images comprises receiving multiple input images and fields of view of at least two of the multiple input images are different.

15. A method as claimed in claim 12, wherein the symmetric pooling operation is performed to subject each feature representation to a common processing logic so as to identify components of the respective feature representation.

\* \* \* \* \*